United States Patent Office 3,423,395
Patented Jan. 21, 1969

3,423,395
PROCESS FOR THE RECOVERY OF MACROMOLECULAR SILVICHEMICAL POLYMERS FROM AQUEOUS SOLUTIONS
George R. Quimby and Otto Goldschmid, Shelton, Wash., assignors to ITT Rayonier Incorporated, New York, N.Y., a corporation of Delaware
No drawing. Continuation-in-part of application Ser. No. 311,669, Sept. 26, 1963. This application Sept. 6, 1966, Ser. No. 577,189
U.S. Cl. 260—209          7 Claims
Int. Cl. C08b 19/00

ABSTRACT OF THE DISCLOSURE

A cyclic process for recovering purified macromolecular silvichemical polymers, from aqueous solutions containing the same by complexing the silvichemical polymer with a high-molecular weight quaternary ammonium chloride and forming a complex precipitate in flocculant, filterable form. This precipitate is then dissolved in a lower aliphatic alcohol from which solution the desired macromolecular product is precipitated in turn with sodium or potassium chloride. The quaternary ammonium chloride and alcohol are then recovered from the filtrate for reuse.

---

This application is a continuation-in-part of our prior application Ser. No. 311,669, filed Sept. 26, 1963, now U.S. Patent No. 3,271,382.

This invention relates to the recovery of large molecular weight organic compounds (herein called macromolecules) from various aqueous solutions in which the macromolecular compound is precipitated with a high molecular weight quaternary ammonium chloride, and has for its object the provision of a process for recovering both the macromolecular compound and the quaternary ammonium chloride from the precipitated quaternary ammonium macromolecule, whereby the macromolecular compound is separated in a useful form and the recovered quaternary ammonium chloride can be reused cyclically in the process. The process of the invention is advantageously applicable for recovering various macromolecular compounds from the aqueous solutions resulting from the chemical processing of tree components which are known as silvichemicals.

This invention is based on the discovery that an alcoholic solution of the precipitated quaternary ammonium macromolecule can be treated with a corresponding sodium or potassium chloride to reform the quaternary ammonium chloride, and also free the macromolecular compound so that both are recoverable in useful form. In one variation of the process macromolecular compounds of different molecular weights may be separated.

The high molecular weight quaternary ammonium chloride (QACl) found useful in the process of the invention can be represented by the following structural formula

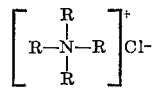

wherein R is an alkyl or aryl radical having from 1 to 20 carbon atoms, at least one of which must contain a minimum of 8 carbon atoms. Typical quaternary ammonium chlorides of this class are: dimethyl quaternary ammonium chloride, methyldodecyl benzyl trimethyl ammonium chloride, methyldodecylxylene bis (trimethyl ammonium chloride), n-alkyl ($C_{14}$, $C_{12}$, $C_{16}$) dimethyl benzyl ammonium chloride, p-diisobutyl phenoxy ethoxy benzyl ammonium chloride, diisobutyl cresoxy ethoxy ethyl dimethyl benzyl ammonium chloride (Hyamine 10–X), soya trimethyl ammonium chloride, polyoxyethylene stearyl methyl ammonium chloride, octadecyl trimethyl ammonium chloride.

Quaternary ammonium chlorides of the foregoing class precipitate quaternary ammonium macromolecules from various aqueous solutions very rapidly at room temperature in a flocculant, nongelatinous form that settles quickly and is easily separated from the solution and washable. When this flocculant precipitate is dissolved in a lower aliphatic alcohol such as methanol or ethanol the addition to the alcohol solution of a sodium or potassium chloride results in an alkali metal macromolecular compound which precipitates from the solution. Coincident with this precipitation the quaternary ammonium chloride is reformed. The alcohol containing the quaternary ammonium chloride is recovered by distillation at the proper temperature and the quaternary ammonium chloride is recovered in its original form by evaporation of excess water.

The process of the invention is especially effective in the recovery of various components from aqueous solutions, neutral, acid or basic, resulting from the pulping of wood, the purification or bleaching of wood pulp or the digestion extraction of chemicals from bark. Such solutions contain polymeric organic compounds of varying molecular weight, other organic compounds of lower molecular weight and frequently various inorganic compounds. The process can remove not only a particular macromolecular compound of a desired molecular weight but it can make practical the recovery of a residual compound or compounds which are left in the solution by reason of the precipitation.

We have found that in the practical and efficient utilization of our process the ratio of QACl to total solids in solution is important. The ratio varies sharply and unpredictably with the composition and origin of the raw material being treated. Too little or too much QACl are both detrimental to the efficiency of the precipitation and the filterability of the precipitate. However for each solution this ratio may easily be determined in a series of test tubes by adding varying amounts of QACl to find the most rapid observable precipitation.

In a typical laboratory procedure a suitable quaternary ammonium chloride such as the dihydrogenated tallow, dimethyl quaternary ammonium chloride, preferably a product called "Formonyte 1703" is added to a 1% solution of the macromolecular compound in, say, an 800-ml. beaker equipped with a mechanical stirrer. Sufficient of the Formonyte is added to bring the QACl/solids ratio required and the mixture added whereupon a heavy precipitate quickly forms. This precipitate is filtered off on a Buchner funnel equipped with a No. 40 Whatman filter paper, washed with approximately 100 ml. of distilled water and pressed to approximately 60% oven dry with a rubber dam and a vacuum. The filter cake is then removed from the funnel, placed in a beaker and mixed with sodium chloride in a ratio of about 5.2/1 QACl/NaCl. 150 ml. of 95% ethanol is then added to the QACl-NaCl and the mixture stirred. The QACl dissolves as the chloride while the alcohol-insoluble sodium salt of the desired macromolecular compound settles out rapidly as an easily filterable material. It is recovered by filtration through a suitable filter, and may be washed with 95% ethanol and dried. The QACl and ethanol have been recovered almost quantitatively from the filtrate by such methods.

The macromolecular compound may be recovered in mass, however, it may be desirable to fractionate the foregoing polymeric material according to molecular weight and the invention provides a simple effective method for accomplishing the fractionation. The solubility of the quaternary ammonium macromolecule in a low molecular weight aliphatic alcohol such as methanol or ethanol varies inversely with the amount of water present and the molecular weight of the macromolecular component of the solution. The quaternary ammonium macromolecule dissolves readily and completely in pure or 95 percent alcohol. As the alcoholic solution is diluted with water, however, a point is reached where the highest molecular weight portion of the quaternary ammonium macromolecule precipitates. The solution will ordinarily tolerate up to about 20 percent water depending on the concentration before precipitation starts. Then, depending upon the degree of fractionation desired in the product, increments of water are added to precipitate the desired molecular weight fractions of the quaternary ammonium macromolecule. Once precipitated, each fraction can be removed from the solution and redissolved in concentrated alcohol to form a solution from which the fractionated macromolecular compound is recovered as a pure alkali metal salt by the addition of NaCl or KCl in the same manner described above. The quaternary ammonium salt and alcohol, of course, are recovered in the same manner.

In carrying out a process of the invention a sufficient quantity of the selected quaternary ammonium chloride is dissolved in water and added to the solution containing the macromolecular compound, at ambient temperature to provide maximum precipitation of the organic macromolecular compound to be recovered and the mixture is agitated. We have found that dimethyl quaternary ammonium chloride (dihydrogenated tallow) is not only relatively inexpensive but technically very effective. The concentration of total solids dissolved in the solution is not critical and can range from about 1 to 50 percent, but for reasons of operating efficiently, a concentration of from about 5 to 10 percent is preferred. The reaction goes to completion very rapidly when the proper ratio of QACl to total solids is used with the macromolecular material and quaternary ammonium salt combining to form a dense flocculant, nongelatinous precipitate which settles out within a minute or two after agitation is stopped, leaving the non-precipitated compounds in solution. The excess solution is then decanted or siphoned off and the precipitated quaternary ammonium macromolecular compound recovered by filtration or centrifuging after which it is washed free of impurities with cold water. The washed precipitate is then dissolved in an aliphatic alcohol (preferably methanol or 95 percent ethanol) to place it in condition for separation of quaternary ammonium salt and macromolecular components of the precipitate and their recovery. If fractionation of the macromolecular product is not required, it is precipitated from the alcoholic solution by the addition of a slight excess of an alcoholic solution of a solution of sodium or potassium chloride. The alkali metal macromolecular compound immediately precipitates out in a dense, rapidly settling form and can be easily separated out and recovered as a pure material.

If it is desired to fractionate a mixture of macromolecular compounds according to molecular weights, the alcoholic quaternary ammonium macromolecular solution prepared as above is diluted with cold water to the point of incipient precipitation of the solution. Then, depending on the number of fractions and the average molecular weight of the compound desired in the same, further increments of cold water are added, the first increment precipitating the fraction with the highest molecular weight. As each fraction is precipitated, it is removed from the solution, washed with water and dried if desired. It is then redissolved in methanol or ethanol and the quaternary ammonium chloride and macromolecular components separated as before.

This invention gives the important result of a rapid and practically complete precipitation of quaternary ammonium macromolecular compounds as silvichemicals derived from the cooking or digestion of wood or bark. An important aspect of the invention is that the quaternary ammonium macromolecular compound can be precipitated from an alcoholic solution with plain water, thereby making it possible to fractionate the compound.

The following examples illustrate operations carried out in accordance with the invention:

The quaternary ammonium chloride (approximately 2% solution) was added with stirring to approximately a 1% solution (2–4 g. of solids) of the silvichemical. The amount of quaternary was roughly adjusted to obtain the maximum amount of precipitate. The precipitate was filtered with Whatman No. 40 paper on a Buchner funnel and washed with approximately 100 ml. of water. The precipitate cake was finally pressed with a rubber dam and vacuumed to approximately 60% O.D.

The 60% O.D. cake was mixed with sodium chloride (QACl/NaCl ratio=5.2) and the mixture stirred in 150 ml. of ethanol. The alcohol-insoluble sodium salts of the silvichemical precipitated and were recovered by filtration through a stainless crucible, washed with 10 ml. of ethanol and finally dried at 50° C. in a vacuum oven.

The following table shows the percentage yield (B) of fractionated silvichemical obtained by precipitation with the indicated ratio of QACl/silvichemical solids (A).

| Silvichemical | QACl | A QACl/ Silvichemical Solids | B "QACl-Free" Product Yield, Percent |
|---|---|---|---|
| 1. Kraft Hot Caustic Extraction Effluent | Formonyte 1619 | 0.5/1 | 0 |
|  | ----do---- | 0.27/1 | 14 |
|  | Formonyte 1703 | 0.5/1 | 16 |
|  | Hyamine 10-X | 1.1/1 | 18 |
| 2. Batch Weak Black Liquor | Formonyte 1619 | 1.7/1 | 0 |
|  | ----do---- | 1.0/1 | 19 |
|  | Formonyte 1703 | 1.0/1 | 41 |
|  | Hyamine 10-X | 1.7/1 | 5 |
| 3. Kamyr Process Weak Black Liquor | Formonyte 1619 | 1.7/1 | 1 |
|  | ----do---- | 1.0/1 | 11 |
|  | Formonyte 1703 | 1.0/1 | 39 |
|  | Hyamine 10-X | 1.7/1 | 7 |
| 4. Hemi Caustic | Formonyte 1619 | ¹0.2/1 | ¹27 |
|  | ----do---- | ¹0.33/1 | ¹26 |
|  | ----do---- | ¹1.7/1 | ¹69 |
|  | ----do---- | ²2.9/1 | ²58 |
|  | Formonyte 1703 | ¹0.33/1 | ¹24 |
|  | ----do---- | ²2.9/1 | ²71 |
|  | Hyamine 10-X | ¹0.33/1 | ¹38 |
|  | ----do---- | ²2.9/1 | ²45 |

See footnotes at end of table.

| Silvichemical | QACl | A<br>QACl/<br>Silvi-<br>chemical | B<br>"QACl-Free"<br>Product<br>Yield,<br>Percent |
|---|---|---|---|
| 5. Low Temperature Alkaline Extract of Coniferous Bark | Formonyte 1619 | 2.0/1 | 57 |
|  | ----do---- | 1.1/1 | 78 |
|  | Formonyte 1703 | 2.0/1 | 73 |
|  | Hyamine 10-X | 2.0/1 | 82 |
| 6. High Temperature Alkaline Extract of Coniferous Bark | Formonyte 1619 | 1.5/1 | 68 |
|  | ----do---- | 0.82/1 | 80 |
|  | Formonyte 1703 | 1.5/1 | 85 |
|  | Hyamine 10-X | 1.5/1 | 93 |
| 7. Kraft Hypochlorite Effluent | Formonyte 1619 | 0.92/1 | 12 |
|  | ----do---- | 1.2/1 | 13 |
|  | Formonyte 1703 | 1.1/1 | 29 |
|  | Hyamine 10-X | 0.92/1 | 18 |

[1] Based on hemi content of hemi caustic rather than total solids.

The different ratios of Formonyte 1619/silvichemical solids show the magnitude of the yield is dependent on this ratio. This is especially illustrated by the kraft hot caustic extraction effluent data where no precipitation occurred with a ratio of 0.5 and 14% yield with a ratio of 0.27.

One advantage of recovering the high molecular weight materials, free of inorganic salts, by the quaternary ammonium chloride process is the possible improved end-use properties of the recovered product. For example, the high molecular weight acidic polymeric carbohydrates recovered from sulfite hot caustic extraction stage effluent (14–18% yield) have been found to have the best overall effectiveness as a sequestering agent for zinc when compared to saccharic acid, glucosocsaccharinic acid, gluconic acid and the total solids from sulfite hot caustic extraction stage effluent.

We claim:

1. The cyclic process for recovering purified, organic, macromolecular, silvichemical polymers from an aqueous solution of the group resulting from the pulping and bleaching of wood and the digestion-extraction of polyphenolic compounds from coniferous tree barks which comprises adding to the solution a high molecular weight quaternary ammonium chloride which reacts with the organic compound, separating from the solution a precipitated quaternary ammonium macromolecular compound, dissolving the precipitated compound in methanol or ethanol, adding to the alcohol solution a sodium or potassium chloride to form a sodium or potassium precipitate of the macromolecular compound and reform the quaternary ammonium chloride, evaporating the alcohol and recovering the quaternary ammonium chloride for cyclic use in the process.

2. The process of claim 1 in which the aqueous solution contains a sulfonated polyphenolic silvichemical extracted by the sulfide digestion of a coniferous bark.

3. The process of claim 1 in which the aqueous solution contains a polyphenolic silvichemical extracted by the alkaline digestion of a coniferous bark.

4. The process of claim 1 in which the aqueous solution contains an organic polymeric silvichemical in a black liquor from the alkaline digestion of wood.

5. The cyclic process for recovering purified, organic, macromolecular, silvichemical polymers from an aqueous solution of the group resulting from the pulping and bleaching of wood and the digestion-extraction of phenolic compounds from coniferous tree barks which comprises adding to the solution a high molecular weight quaternary ammonium chloride which reacts with and precipitates the organic compound, separating from the solution the precipitated quaternary ammonium macromolecular compound, dissolving the precipitated compound in methanol or ethanol, adding to the alcohol solution a predetermined amount of water to effect a precipitation of a desired molecular weight fraction of the macromolecular compound.

6. In the process of claim 5 adding successive predetermined quantities of water to the alcohol solution to effect successive precipitations of different molecular weight fractions of the macromolecular compound.

7. In the process of claim 5 drying the precipitated molecular weight fraction, redissolving it in methanol or ethanol, adding to the alcohol solution sodium chloride or potassium chloride to precipitate the alkali metal macromolecular compound and reform the quaternary ammonium chloride, separating the alkali metal macromolecular compound, evaporating the alcohol and recovering the quaternary ammonium chloride for cyclic reuse in the process.

References Cited

UNITED STATES PATENTS 2,853,414   9/1958   Wimmer _____ 260—209
3,119,812   1/1964   Rogovin et al. _____ 260—209

LEWIS GOTTS, *Primary Examiner.*

J. R. BROWN, *Assistant Examiner.*

U.S. Cl. X.R.

260—17.2, 124